(12) United States Patent
Weber

(10) Patent No.: US 6,241,439 B1
(45) Date of Patent: Jun. 5, 2001

(54) LUGGAGE SECURITY ARRANGEMENT IN A MOTOR VEHICLE CARGO SPACE

(75) Inventor: Norbert Weber, Bondorf (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/135,578

(22) Filed: Aug. 18, 1998

(30) Foreign Application Priority Data

Aug. 18, 1997 (DE) .............................................. 197 35 819

(51) Int. Cl.$^7$ ....................................................... B60P 7/08
(52) U.S. Cl. ............................................. 410/94; 410/121
(58) Field of Search .............................. 410/94, 95, 121, 410/153; 248/351; 224/42.34, 42.35

(56) References Cited

U.S. PATENT DOCUMENTS

| | | | |
|---|---|---|---|
| 4,416,579 | * 11/1983 | Alberti | 410/94 X |
| 4,784,547 | * 11/1988 | Prinz et al. | 410/153 X |
| 4,842,317 | * 6/1989 | Moore | 410/94 X |
| 5,092,250 | * 3/1992 | Halliar | 410/121 X |
| 5,785,473 | * 7/1998 | Stark | 410/94 |
| 5,788,310 | * 8/1998 | McKee | 410/80 X |
| 5,961,262 | * 10/1999 | Weber | 410/94 |

FOREIGN PATENT DOCUMENTS

| | | | |
|---|---|---|---|
| 2212646A | 9/1973 | (DE) . | |
| 2931320A | 2/1981 | (DE) . | |
| 2931320C2 | 9/1982 | (DE) . | |
| 3618996A | * 12/1987 | (DE) | 410/121 |
| 3738762A1 | 5/1989 | (DE) . | |
| DB 9818 | 10/1998 | (GB) . | |
| 58-105846 | 6/1983 | (JP) . | |
| 62-120271 | 6/1987 | (JP) . | |
| WO81/00392 | 2/1981 | (WO) . | |

OTHER PUBLICATIONS

Patent Abstracts of Japan, DE3738762A, May 24, 1989, 1 page.
Preliminary Examination Report, France, Apr. 30, 1999, 3 pages.

* cited by examiner

Primary Examiner—Stephen T. Gordon
(74) Attorney, Agent, or Firm—Evenson, McKeown, Edwards & Lenahan, P.L.L.C.

(57) ABSTRACT

An arrangement is provided for securing objects against a sliding in a cargo space of a motor vehicle. Supporting elements are arranged perpendicularly to the cargo space floor and can be adjusted relative to the cargo space floor between a lifted active position and a lowered passive position. A cargo plate extends in parallel to the cargo space floor and has openings which can each be penetrated by a supporting element. The cargo plate is further developed such that the loading of the cargo space can take place in a normal manner and a securing of the objects can be ensured during the transport. A lifting device causes a relative movement between the cargo plate and the supporting elements which extends perpendicularly to the cargo space floor. In a loading position, the ends facing the cargo space of the supporting elements situated in their active position end flatly with the top side of the cargo plate and, in a securing position, the supporting elements, in their active position, extend through the opening in each case assigned to them into the cargo space and in each case being lowerable into their passive position.

15 Claims, 3 Drawing Sheets

LUGGAGE SECURITY ARRANGEMENT IN A MOTOR VEHICLE CARGO SPACE

BACKGROUND AND SUMMARY OF THE INVENTION

This application claims the priority of German application 197 35 819.5-22, filed in Germany on Aug. 18, 1997, the disclosure of which is expressly incorporated by reference herein.

The invention relates to an arrangement for securing objects against a sliding in a cargo space of a motor vehicle, particularly of a passenger car.

From German Patent Document DE-PS 29 31 320 C2, an arrangement is known which has a cargo plate containing openings through which pin-shaped supporting elements project into the cargo space. In this case, on their underside facing the vehicle floor, the supporting elements are supported or prestressed into the active position by a compressible layer, which preferably consists of a foamed material. If an object is placed in an area of the cargo space on the supporting elements arranged there, because of the low compressibility of the foamed material, these supporting elements can be lowered into the openings of the cargo plate in the direction of the cargo space floor. As a result, the object rests on the lowered supporting elements and is surrounded laterally by the adjoining, not loaded supporting elements and is form-lockingly secured by them against a sliding.

In the case of the cargo space equipped with the known arrangement, during the loading of the cargo space, the object to be secured must be placed or deposited precisely at the point in the cargo space where it is to be located during the transport. A subsequent shifting, for example, for a better utilization of the space, will no longer be possible because the object is secured against a sliding by the known arrangement immediately after being placed or deposited. However, in many passenger car models, the whole trunk floor is not directly accessible from above; for example, the area adjoining the back seats is always covered by a rear window shelf. In addition, heavier objects are normally first deposited farther in the rear in the longitudinal direction of the vehicle on the trunk floor and are then pushed toward the front. After the installation of the known arrangement, this will no longer be possible. The trunk space can therefore no longer be optimally utilized.

From German Patent Document DE 37 38 762 A1, an anti-sliding device on a depositing surface is known which has an elastic mat with naps which are directed upward in a spaced manner. A supporting plate with a smooth surface and passage openings for the naps of the plate is arranged on the mat and can be vertically adjusted between a loading or unloading position and a securing position. The supporting plate is lifted by an adjusting device into its loading and unloading position beyond the naps and is lowered into its securing position such that the naps, projecting from the surface of the supporting plate through the passage openings, protect the objects deposited on the naps and by means of their adhesive effect, secure them against shifting.

In contrast to the above-described securing of luggage, in which the objects deposited in the cargo space are laterally surrounded by the supporting elements adjoining them and are form-lockingly secured by them, the securing in the case of the known anti-slide device is based only on the adhesive friction established between the naps and the objects deposited on them. However, this adhesive friction can be overcome during a relatively fast cornering by the vehicle. In addition, the achievable luggage securing effect depends significantly on the surface condition of the pieces of luggage deposited in the cargo space.

The present invention relates to the problem of further developing an arrangement of the initially mentioned type such that the security of the objects deposited on it can be improved, particularly during the transport.

According to the invention, this problem is solved by means of an arrangement for securing objects against a sliding in a cargo space of a motor vehicle comprising supporting elements which are arranged approximately perpendicularly to a cargo space floor and can be adjusted approximately perpendicularly to the cargo space floor between a lifted active position and a lowered passive position, and a cargo plate which extends approximately in parallel to the cargo space floor and has openings which can each be penetrated by respective ones of the supporting elements, and a lifting device by means of which a relative movement between the cargo plate and the supporting elements which extends approximately perpendicularly to the cargo space floor can be carried out, wherein, in a first end position of this relative movement corresponding to a loading position, the ends of the supporting elements facing the cargo space situated in their active position ending approximately flatly with a top side of the cargo plate facing the cargo space, and wherein, in a second end position corresponding to a securing position, the supporting elements in their active position extending through the opening respectively assigned to them into the cargo space and being in each case lowerable by means of a load applied to the end facing the cargo space to the top side of the cargo plate into their passive position and ending approximately planely with the cargo plate.

The invention is based on the general idea of adjusting all supporting elements relative to the cargo plate such for the loading that an approximately plane surface is formed on the top side of the cargo plate facing the cargo space, which surface can be loaded in a normal manner. For securing the objects placed or deposited on the cargo space floor or the cargo plate, a relative movement is again carried out between all supporting elements and the cargo plate, in which case, in the areas of the cargo plate not covered by the cargo objects, the supporting elements can penetrate these areas and frame the objects laterally and secure them against shifting. In contrast, the supporting elements arranged in the areas covered by the objects are stressed axially from above during the relative movement by the weights of the objects and, as a result, are adjusted into their passive position. Even after the conclusion of the relative movement, the supporting elements below the cargo, because of the stressing, will essentially still end approximately flatly with the cargo plate.

In order to carry out this movement of the supporting elements relative to the cargo plate or of the cargo plate relative to the supporting elements, a lifting device is provided according to the invention.

In a preferred embodiment of the arrangement, a floor plate is provided which extends approximately in parallel to the cargo space floor and on which the supporting elements are in each case fastened on their end facing away from the cargo space, wherein the cargo plate is fixed relative to the cargo space floor in the cargo space, and wherein the floor plate can be adjusted relative to the cargo plate by means of the lifting device. Thus, a floor plate carrying the supporting elements is arranged in the cargo space in an adjustable manner with respect to the cargo plate. By means of this embodiment, even in the case of a fully loaded cargo plate, only relatively low forces must be applied by the lifting device to the floor plate in order to adjust the latter.

An alternative embodiment can be developed at lower expenditures and therefore at lower cost, wherein the cargo plate can be adjusted relative to the cargo space floor by the lifting device. In addition, in the case of this variant, the arrangement according to the invention has a slightly larger cargo volume available when the cargo plate is in its securing position in which it is lowered with respect to the cargo space floor.

In order to further develop the arrangement according to the invention in a particularly space-saving manner, each supporting element is fastened by means of its end facing away from the cargo space on the cargo space floor or on a carrier plate situated thereon. Thus, supporting elements can be fastened directly on the cargo space floor. An alternative embodiment, in which the supporting elements are fastened on an additional carrier plate, makes it possible to prefabricate the arrangement as a uniform assembly which can be installed completely, particularly subsequently, in the cargo space.

A particularly low-cost further development of the arrangement according to the invention provides a lifting device with a manually operable lever which causes the relative movement between the cargo plate and the supporting elements. The suggested activating lever is preferably arranged on the end of the trunk or the cargo space of a passenger which is in the rear in the driving direction.

Preferred embodiments of the arrangement according to the invention are characterized in that (i) each supporting element has a telescopic construction so that an area of the supporting element facing away from the cargo space floor can be bidirectionally adjusted between the lifted active position and the lowered passive position; (ii) each supporting element is prestressed by means of spring devices into its active position; and (iii) each supporting element comprises two cup-shaped half shells, of which one is fastened by means of its axially closed end on the cargo space floor, on the carrier plate or on the floor plate, and the other projects by means of its axially closed end into the pertaining opening in the cargo plate or projects through it, the half shells being fitted into one another on their axially open ends and being axially slidable with respect to one another, and a pressure spring arranged between the half shells and supported on the inside on the axially closed ends of the half shells prestressing the half shells and the supporting element into the active position. Having these characteristics, the supporting elements are very compact so that they require as little space as possible in their passive position. Thus, the arrangement according to the invention reduces the cargo space only insignificantly. In addition, the fastening on the cargo space floor, on the carrier plate or on the floor plate may be constructed to be relatively rigid so that the supporting elements can absorb relatively high forces also in a small number in order to secure objects in the cargo space.

In a further development of the arrangement according to the invention it is provided that carrier elements are arranged between the supporting elements, which carrier elements are fastened on the cargo space floor, on the carrier plate or on the floor plate and against which the cargo plate comes to rest in the securing position. Thus, the lifting device can be relieved during the transport because, in the securing position, all carrying forces can be absorbed by the suggested carrying elements.

Other objects, advantages and novel features of the present invention will become apparent from the following detailed description of the invention when considered in conjunction with the accompanying drawings.

DETAILED DESCRIPTION OF THE DRAWINGS

Figure 1:
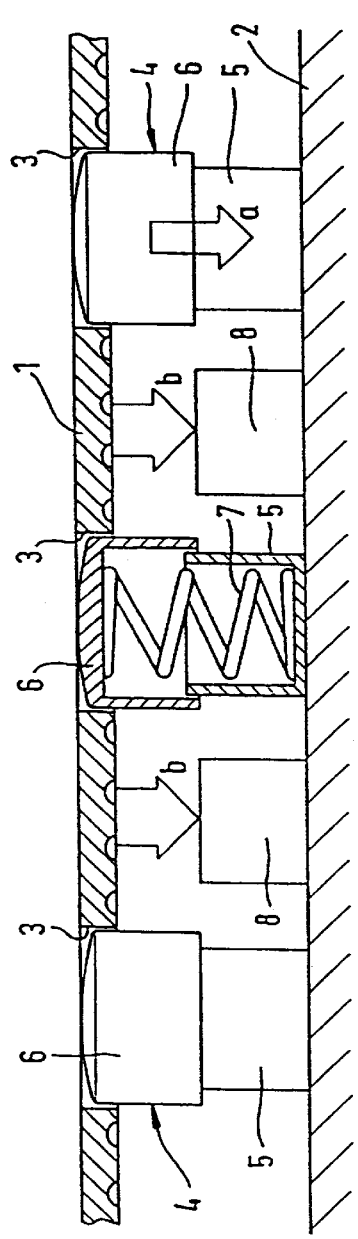
FIG. 1 is a schematic sectional view of an area of a cargo space floor with an arrangement according to the invention whose vertically adjustable cargo plate is in the loading position, as well as a schematic longitudinal sectional view of a supporting element of the arrangement according to the invention.
Figure 4:
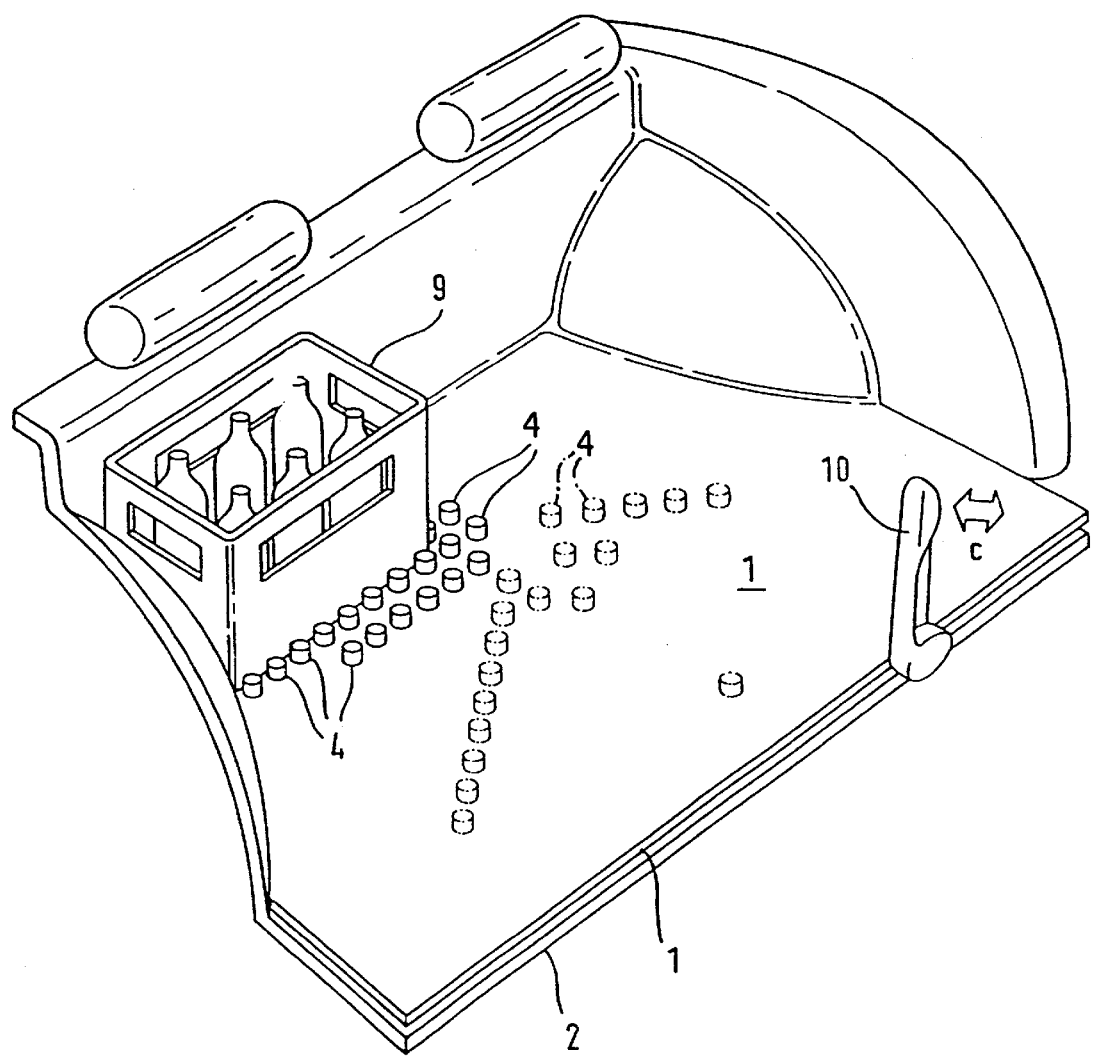
FIG. 4 is a perspective top view of a cargo space which is equipped with an arrangement according to the invention.

Corresponding to FIG. 1, the arrangement according to the invention has a cargo plate 1 which is arranged approximately in parallel to a cargo space floor 2 and can be adjusted essentially perpendicularly to the cargo space floor 2 by means of a lifting device which is not shown in FIG. 1 (compare lever 10 in FIG. 4). In FIG. 1, the cargo plate 1 is in its lifted position which in the following will be called the loading position.

In the cargo plate 1, several circular openings 3 are provided into which one essentially cylindrical supporting element 4 respectively projects. In this case, the axially free ends of the supporting elements 4 facing away from the cargo space floor 2, in the loading position, close off approximately flatly with the top side of the cargo plate 1 facing the cargo space. Instead of a circular cross-section, the supporting elements 4 may also have arbitrary different cross-sections, such as a rectangular or a square cross-section.

In the illustrated embodiment, each supporting element 4 has a telescope-type construction and has a lower cup-shaped half shell 5 which is fastened with its closed axial end in a suitable manner on the cargo space floor 2. A cup-shaped upper half shell 6 is placed on the lower half shell 5, the edge areas of the open axial ends of the half shells 5 and 6 overlapping. Preferably, the outside diameter of the lower half shell 5 is slightly smaller than the inside diameter of the upper half shell 6 so that the half shells 5 and 6 can be axially adjusted with respect to one another telescopically.

The closed exterior axial end of the upper half shell 6 preferably has a convexly rounded construction in order not to construct an obstacle on the top side of the cargo plate 1 in the loading position even if the convex end projects slightly beyond the top side of the cargo plate 1. In the interior of the half shells 5 and 6, a pressure spring 7 is arranged which, in the interior, is supported on the closed axial ends of the half shells 5 and 6. The pressure spring 7 prestresses the half shells 5 and 6 into the active position of the supporting element 4 illustrated in FIG. 1. Instead of the pressure springs 7, gas pressure devices may also be used as the spring devices. Likewise, each supporting element 4 may be constructed as a shock-absorber-type component. In order to obtain a defined active position of the supporting element 4 or in order to obtain a defined position of the half shells 5 and 6 with respect to one another in this active position, stop devices may additionally be provided which are not shown and by means of which the adjusting movement caused by the pressure spring 7 is axially limited.

Figure 5:
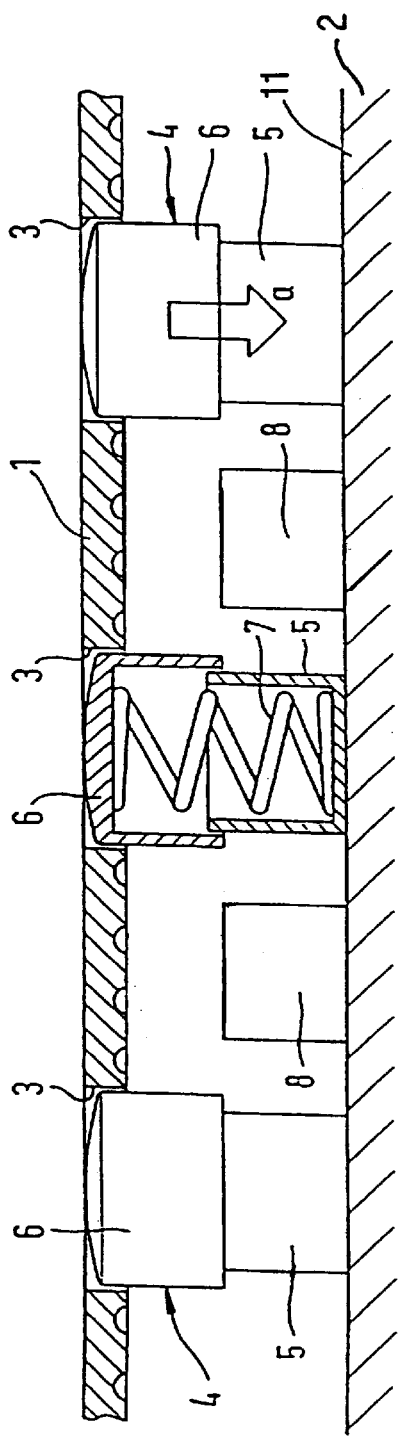
FIG. 5 is a schematic sectional view of an arrangement according to the invention with an adjustable floor plate having supporting elements in the passive position.
Figure 6:
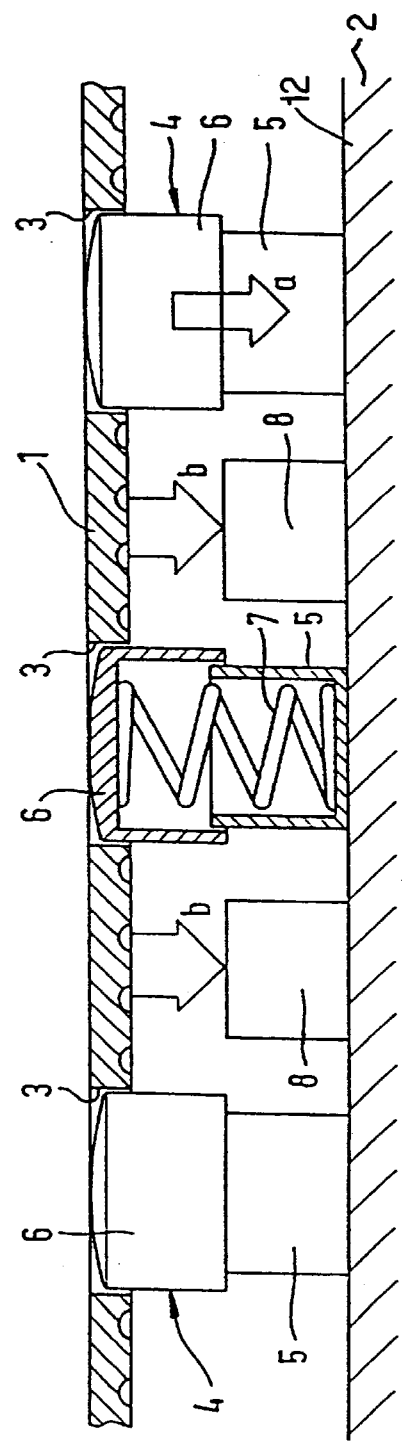
FIG. 6 is a schematic sectional view as in FIG. 1 with a carrier plate.

In another embodiment, the lower half shells 5 and thus the supporting elements 4, instead of being fastening directly on the cargo space floor 2, may be fastened on an floor plate 11 (as shown in FIG. 5) or an additional carrier plate 12 (as shown in FIG. 6) which, when the arrangement is installed in the cargo space, rests on the cargo space floor 2. This embodiment permits a complete preassembly of the arrangement according to the invention and facilitates the final mounting in the respective cargo space. In addition, a subsequent installation is possible.

When an axially effective pressure force is exercised on the convex end of the upper half shell 6, the upper half shell 6 will be adjusted axially in the direction of the arrow a (right supporting element 4 in FIG. 1) with respect to the lower half shell 5 until the supporting element 4 reaches its passive position.

By the activation of the lifting device, the cargo plate 1 can be lowered corresponding to the arrows b with respect to the cargo space floor 2 until it reaches its lower position which in the following will be called the securing position.

Figure 2:
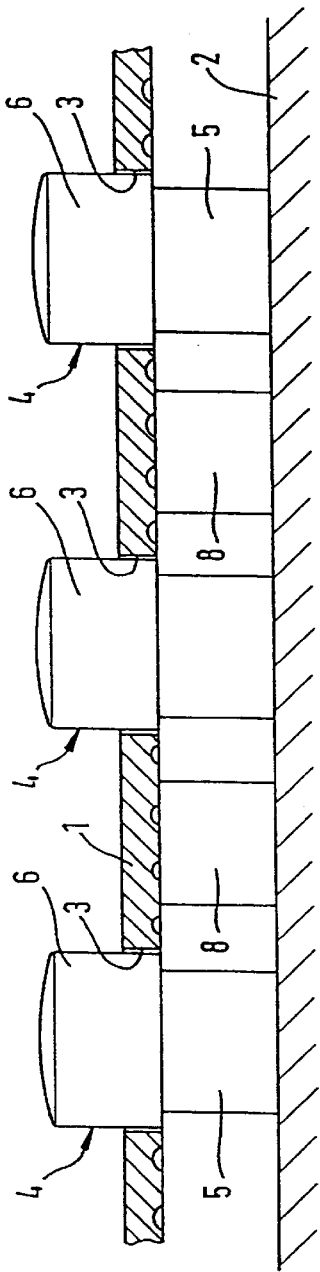
FIG. 2 is a schematic sectional view as in FIG. 1 but with the cargo plate in its securing position, in which case all illustrated supporting elements are in their active position.

Corresponding to FIG. 2, in the securing position of the cargo plate 1, the supporting elements 4 or their upper half shells 6 project through the openings 3 approximately vertically into the cargo space. In order to be able to absorb larger loads and in order to relieve the lifting effect, in the illustrated embodiment, carrier elements 8 are arranged between the supporting elements 4 on which carrier elements 8 the cargo plate rests 1 with its underside when it is in its securing position. These carrier elements 8 may be constructed in a cubic or in a web-shaped manner and may be arranged particularly in the form of a grid structure on the cargo space floor 2 and may be fastened to it in a suitable manner.

Figure 3:
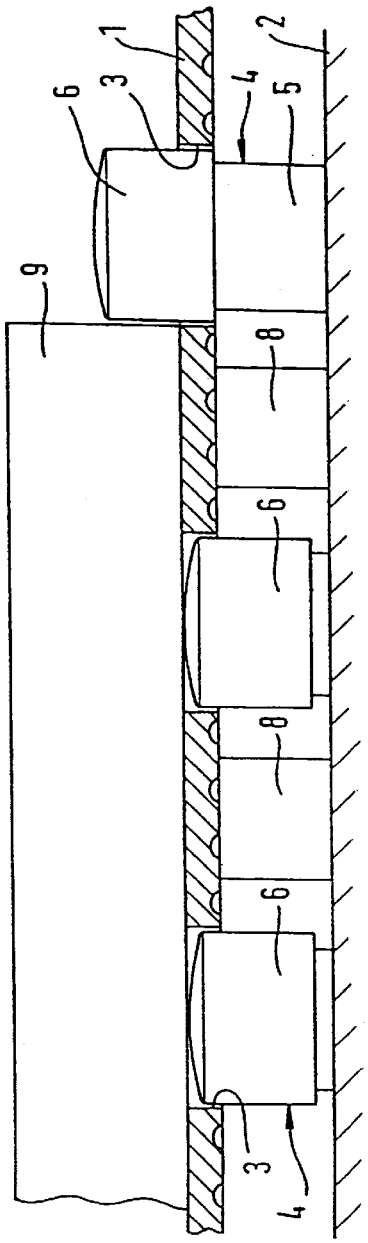
FIG. 3 is a schematic sectional view as in FIG. 2 but with an object placed on the floor plate, in which case the individual supporting elements are in their passive position.

When the cargo plate 1 is in its lifted loading position, its top side has an essentially plane surface on which objects can easily be slid in parallel to the plane of the cargo plate 1. Furthermore, in a preferred embodiment, the top side of the cargo plate 1 may be constructed in a particularly low-friction manner (for example, by means of a suitable coating), whereby the displacement of the cargo is simplified in the loading position. When the user of the device has moved or displaced an object to be transported into the position provided for this purpose, he activates the lifting device and thus lowers the cargo plate 1 into its securing position. In the areas in which, corresponding to FIG. 3, an object 9 covers individual supporting elements 4, during the lowering movement, its weight presses onto the convex ends of the upper half shells 6 and causes an axial adjustment of the supporting elements 4 into their passive position. In FIG. 3, the two left supporting elements 4 have reached their passive position while the right supporting element 4 which is not covered by the object 9 remains in its active position. The supporting elements 4 which adjoin the object 9 laterally and are not covered by it frame the object 9 laterally and in this manner prevent a sliding in the cargo space.

As an example, FIG. 4 shows the cargo space of a passenger car which is otherwise not shown and which is equipped with the arrangement according to the invention. In this case, the cargo plate 1 is in its securing position so that the object 9, in this case the box of beverages, is framed by the adjoining supporting elements 4 and is secured against a sliding.

At the end of the cargo space which is in the rear in the driving direction, an activating lever 10 is arranged by means of which the lifting device can be operated manually for the lifting and lowering of the cargo plate 1. In this case, the illustrated vertical position of the activating lever 10 must not correlate with the securing position of the cargo plate 1. The activating lever 10 is preferably moved corresponding to the double arrow c about a swivel axis extending in parallel to the longitudinal axis of the vehicle. Instead of a manually operated lever 10, an electric, hydraulic or pneumatic activating device may be provided for the lifting device.

Preferably, the whole cargo space floor 2 is provided in a grid-shaped manner with supporting elements 4. However, as clearly shown in the embodiment illustrated in FIG. 4, a selection of preferred, particularly suitable positions for the supporting element 4 can also be made, whereby the arrangement according to the invention can be produced at considerably lower cost. The selection illustrated in FIG. 4 reflects several positions for the supporting elements 4 which are preferred in this case, only as an example, without limiting the selection for the arrangement of the supporting elements 4 to the above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for securing objects against a sliding in a cargo space of a motor vehicle, comprising:
   a cargo plate having a plurality of openings;
   supporting elements arranged approximately perpendicularly to the cargo plate and adjustable in said openings between an active position and a passive position,
   a lifter operable to move the cargo plate;
   wherein, in the passive position, the supporting elements are approximately disposed flatly with a top side of the cargo plate, and
   wherein, in the active position, the supporting elements extend through the respective openings and are lowerable by means of a load applied to the top side of the cargo plate into the passive position, thereby securing the load in the cargo space.

2. Arrangement according to claim 1, wherein carrier elements are arranged between the supporting elements, which carrier elements are fastened on a carrier plate or on a floor plate and against which the cargo plate comes to rest in a securing position.

3. Arrangement according to claim 1, wherein the cargo plate is adjusted by the lifter.

4. Arrangement according to claim 3, wherein each supporting element is fastened by means of an end facing away from the cargo space on a carrier plate.

5. Arrangement according to claim 1, wherein the lifter comprises a manually operable lever which causes movement between the cargo plate and the supporting elements.

6. Arrangement according to claim 4, wherein carrier elements are arranged between the supporting elements, which carrier elements are fastened on the carrier plate and against which the cargo plate comes to rest in a securing position.

7. Arrangement according to claim 4, wherein the lifter comprises a manually operable lever which causes movement between the cargo plate and the supporting elements.

8. Arrangement according to claim 1, wherein each supporting element has a telescopic construction, thereby allowing bidirectional adjustment between the active position and the passive position.

9. Arrangement according to claim 8, wherein each supporting element is prestressed by means of a spring device into the active position.

10. Arrangement according to claim 9, wherein each supporting element comprises:

two cup-shaped half shells, of which one is fastened by means of an axially closed end on a carrier plate or on a floor plate, and the other projects by means of an axially closed end into the respective opening in the cargo plate or projects through said respective opening, the half shells being axially slidable with respect to one another, and wherein the spring device is arranged between the half shells and supported on the inside on the axially closed ends of the half shells prestressing the half shells and the supporting element into the active position.

11. Arrangement according to claim 5, wherein carrier elements are arranged between the supporting elements, which carrier elements are fastened on a carrier plate or on a floor plate and against which the cargo plate comes to rest in a securing position.

12. Arrangement according to claim 10, wherein carrier elements are arranged between the supporting elements, which carrier elements are fastened on the carrier plate or on the floor plate and against which the cargo plate comes to rest in a securing position.

13. An arrangement for securing objects against a sliding in a cargo space of a motor vehicle, comprising:

a cargo plate having a plurality of openings;

supporting elements arranged approximately perpendicularly to the cargo plate and adjustable in said openings between an active position and a passive position;

a floor plate approximately parallel to the cargo plate and on which the supporting elements are fastened;

a lifter operable to move the floor plate;

wherein, in the passive position, the supporting elements are approximately disposed flatly with a top side of the cargo plate, and wherein, in the active position, the supporting elements extend through the respective openings of the cargo plate and are lowerable by means of a load applied to the top side of the cargo plate into the passive position, thereby securing the load in the cargo space.

14. Arrangement according to claim 13, wherein the lifter comprises a manually operable lever which causes relative movement between the cargo plate and the supporting elements.

15. Arrangement according to claim 13, wherein carrier elements are arranged between the supporting elements, which carrier elements are fastened on the floor plate and against which the cargo plate comes to rest in a securing position.

* * * * *